United States Patent [19]

Chandalia et al.

[11] 4,312,963
[45] Jan. 26, 1982

[54] STABILIZATION OF HIGH RESILIENCE POLYURETHANE FOAM

[75] Inventors: Kiran B. Chandalia, Cheshire; Henry G. Barnowski, Durham, both of Conn.

[73] Assignee: Olin Corporation, New Haven, Conn.

[21] Appl. No.: 227,312

[22] Filed: Jan. 22, 1981

Related U.S. Application Data

[60] Division of Ser. No. 6,951, Jan. 25, 1979, Pat. No. 4,278,770, which is a continuation-in-part of Ser. No. 898,274, Apr. 20, 1978, abandoned, which is a continuation-in-part of Ser. No. 881,297, Feb. 27, 1978, abandoned.

[51] Int. Cl.$^3$ .............................................. C08L 27/06
[52] U.S. Cl. ..................................... 525/56; 252/182; 526/344; 526/341; 526/346
[58] Field of Search ................ 252/182; 526/344, 346, 526/341; 525/56

[56] References Cited

U.S. PATENT DOCUMENTS

| | | | |
|---|---|---|---|
| 3,004,921 | 10/1961 | Stossel | 260/2.5 AK |
| 3,021,290 | 2/1962 | Gmitter et al. | 260/2.5 AK |
| 3,024,209 | 3/1962 | Ferrigno | 260/2.5 AK |
| 3,150,109 | 9/1964 | Ferrigno | 260/2.5 AK |
| 3,298,976 | 1/1967 | Reinhart | 260/2.5 AK |
| 3,383,351 | 5/1968 | Stamberger | 260/33.2 |
| 3,396,126 | 8/1968 | Gurley, Jr. et al. | 260/2.5 AK |
| 3,441,523 | 4/1969 | Dwyer et al. | 260/2.5 AK |
| 3,467,606 | 9/1969 | Rice | 260/2.5 AH |
| 3,598,772 | 8/1971 | Hood et al. | 260/2.5 |
| 3,600,340 | 8/1971 | Patton, Jr. et al. | 260/2.5 AK |
| 3,640,920 | 2/1972 | Cear | 260/2.5 AK |
| 3,652,639 | 3/1972 | Pizzini et al. | 260/465.4 |
| 3,716,502 | 2/1973 | Loew | 260/2.5 AK |
| 3,772,222 | 11/1973 | Steward et al. | 260/2.5 AM |
| 3,772,224 | 11/1973 | Marlin et al. | 260/2.5 AM |
| 3,775,350 | 11/1973 | Juhas | 260/2.5 AK |
| 3,823,096 | 7/1974 | Fabris et al. | 260/2.5 AM |
| 3,823,201 | 7/1974 | Pizzini et al. | 260/861 |
| 3,880,780 | 4/1975 | Ridenour et al. | 260/2.5 AM |
| 3,909,464 | 9/1975 | Anorga et al. | 260/2.5 AK |
| 3,925,266 | 12/1975 | Fabris et al. | 260/2.5 AM |
| 3,926,867 | 12/1975 | Quock et al. | 260/2.5 AM |
| 3,931,062 | 1/1976 | Cobbledick | 260/2.5 AK |
| 3,931,066 | 1/1976 | Puig et al. | 260/2.5 AS |
| 3,933,701 | 1/1976 | Puig et al. | 260/2.5 AT |
| 4,005,035 | 1/1977 | Deaver | 260/2.5 AK |
| 4,022,941 | 5/1977 | Prokai et al. | 260/2.5 AH |
| 4,029,593 | 6/1977 | Schäpel et al. | 252/182 |
| 4,062,825 | 12/1977 | Watabe et al. | 260/37 N |
| 4,108,791 | 8/1978 | Wasilczyk | 252/182 |

OTHER PUBLICATIONS

*Standard Method of Test for Fineness of Dispersion of Pigment-Vehicle Systems*, ASTM Designation: D 1210-64, pp. 228-233 (1964).

*Primary Examiner*—Maurice J. Welsh
*Attorney, Agent, or Firm*—William D. Sabo

[57] ABSTRACT

Polyol compositions containing effectively dispersed particulate material featuring critical dispersion characteristics are used to stabilize foam reaction in high resilience polyurethane foam.

9 Claims, No Drawings

STABILIZATION OF HIGH RESILIENCE POLYURETHANE FOAM

This is a division of application Ser. No. 006,951 filed Jan. 25, 1979, now U.S. Pat. No. 4,278,770, filed July 14, 1981, which is a continuation-in-part of copending application Ser. No. 898,274, filed Apr. 20, 1978 now abandoned, which in turn is a continuation-in-part of application Ser. No. 881,297, filed Feb. 27, 1978 now abandoned.

Polyurethane foams commonly are prepared by reacting a polyether polyol with an organic polyisocyanate in the presence of a blowing agent and a reaction catalyst. Various polyether polyols have been employed in making such foams; the resulting foam can range in physical properties from very flexible to fully rigid depending on the hydroxyl number of the chosen polyol.

In the art of making flexible polyurethane foam, it is known that by utilizing foam-forming formulations incorporating a highly reactive organic polyisocyanate and a high molecular weight polyol having a certain level of primary hydroxyl content, a foam with improved resilience and other desirable physical properties can be accomplished. Such resulting foams have come to be referred to in the art as "high resilience" foams. Resilience is defined as the ability to return to original shape and dimensions after a defoaming force has been applied and removed from a body. In polyurethane foam technology, the industry generally considers "SAC factor" to be the differentiating characteristic between high resilience and conventional foams. This SAC factor, a measure of support provided by cushioning material, is the ratio of indent load deflection at 65% deflection to that of indent load deflection at 25% deflection (per ASTM D-1564-64T). According to SPI standards, conventional foams exhibit a SAC factor of about 1.7 to 2.2; high resilience foams have a factor above about 2.2 to about 3.2.

High resilience foams have found widespread application as cushioning material in furniture and bedding. Most significantly, these foams have been utilized in the automotive industry for making molded auto seats. The acceptance of these relatively new foams can be attributed to the fact that most already established polyurethane foam techniques can be readily applied to high resilience foams. However, foam stabilization and collapsing, one particular area of technology, has been found to be markedly non-transferable. Due to the highly reactive nature of the reaction mixture from which the high resilience foams are prepared, such foams have been found to exhibit characteristic pre-cure shrinkage. Conventional foam reaction mixture components which serve to stabilize the composition as it reacts, foams, and solidifies, are ineffective to prevent shrinkage or collapse in high resilience foaming reactions. Moreover, conventional stabilizers actually tend to cause severe voids, splits and shrinkage of the foam product.

Several approaches have been developed to meet the stabilization requirements of high resilience foams. For example, U.S. Pat. No. 3,880,780 teaches the use of a stabilized foam formulation comprising a select polyether polyol and polyisocyanate mixture, and an aromatic amine curing agent. In U.S. Pat. No. 3,931,066, a select blend of main and supplemental polyether polyols is taught to result in a stabilized foam product. Select methylene-bridged diaryl polyisocyanates are described in U.S. Pat. No. 3,933,701 as being useful to stabilize high resilience foam from pre-cure collapse shortly after foaming.

In order to achieve foaming stability and enhanced load bearing characteristics, it also has become popular to employ "polymer-polyol" processing systems in high resilience foam production. Such polymer-polyols, produced from ethylenically unsaturated monomers and polyols, are exemplified by the materials described in U.S. Pat. Nos. 3,383,351, 3,652,639 and 3,823,201. These polymer-polyols commonly are mixed with conventional polyether polyols and used as the starting polyol reactant.

Another reference, U.S. Pat. No. 4,108,791, discloses that high resilience polyurethane foams with improved foam properties can be accomplished by preparing the foam from polyols containing an inorganic filler, having an adjusted pH value of 6-8.5.

It has now been discovered, according to the present invention, that by incorporating a small proportion of effectively dispersed select fine particulate material into the foam reaction mixture, high resilience polyurethane foam can be stabilized against pre-cure collapse or shrinkage, while maintaining other desirable foam properties.

It has previously been known in the polyurethane foam art to employ fine particulate matter in foam formulations, either as a filler, for economic reasons, or to impart certain physical characteristics to the foam product. For example, it is taught in U.S. Pat. No. 3,640,920 that rigid, low density insulating foam compositions featuring favorable "freezer stability" can be prepared from a reaction mixture containing about 0.05 to about 0.5 percent by weight of fine particles, ranging from 0.01 to about 250 microns in size.

Another patent, U.S. Pat. No. 3,441,523, describes the use of at least 5 percent by weight of particulate filler materials, in the size range of about 2 to 25 microns, to prepare filled, flexible, cellular urethanes without depreciation of important physical characteristics.

Use of a filler substance commonly results in inferior physical properties which offsets the economic advantages of its utility. U.S. Pat. No. 3,150,109 discloses another approach to relieving this problem. By coating common filler pigment materials with an amine alcohol composition, it is disclosed that an appreciable amount of filler can be used without significantly affecting the physical properties of low density, open-celled foams.

As mentioned above, U.S. Pat. No. 4,108,791 describes the use of select inorganic filler particles to improve high resilience flexible polyurethane foam properties. This reference teaches that in order to effectively overcome certain foam deficiencies, the inorganic filler employed must have a pH of from about 6.5 to about 8.5 and an effective particle size of less than about 7 microns. Various suitable inorganic fillers are listed, including amorphous fumed silica. In order to prepare effective filler material, commercially available fillers, such as fumed silica, having the specified particle size, are treated with a suitable base or acid, as each situation may dictate, in order to adjust the pH of the material to between 6.5 and 8.5. When untreated filler materials, having a pH outside the specified range, are used in producing high resiliency foams, it is demonstrated that inferior foams are formed which exhibit unacceptable problems, such as shrinkage.

Surprisingly, it has now been discovered that rather than pH or initial primary particle size, the degree of dispersion of the particulate material in the reaction mixture is a critical factor in stabilization effectiveness. Upon being blended into a polyol composition, fine particulate material undergoes agglomeration, forming clusters of particles markedly larger than the individual particles themselves. Particle agglomerates in a blended polyol composition commonly have been found to exhibit effective sizes more than 100 times greater than the initial size of the individual particles. High resilience foam reaction formulations containing fine particulate material which has not been selectively blended to ensure a reduced effective dispersed particle size within the critical limits, as presently defined, fail to avoid unacceptable shrinkage.

According to the present invention, high resilience foam reaction stabilization is accomplished by using a polyol reactant composition containing a small proportion of effectively dispersed fine particulate material. Practicing the method of the present invention, suitable fine particulate material is dispersed in the polyol composition to form a dispersion in which the fineness or effective maximum size of the particles, or particle agglomerates, in the dispersion is less than about 75 microns (e.g., per ASTM D-1210-64). Such a dispersion can be accomplished by using high shear mixers or other blending equipment which effectively eliminates agglomerates or reduces the particle agglomerate size to form a polyol composition featuring dispersed particle characteristics within the specified critical range. Preferably, the effective particle size in dispersion is less than about 50 microns; most preferably about 25 microns or less. An effective maximum particle size in dispersion ranging between about 10 to about 20 microns has been found to be particularly preferred.

The particulate materials that are utilized according to the present invented method are select, finely divided, solid particles that are compatible with, but insoluble in, the foam reaction mixture. Preferably, the particles have an average primary particle size of less than about 75 microns, a surface area of at least about 30 m$^2$/g, and exhibit a bulk density of from about 1 to about 65 lbs./ft.$^3$. Naturally occurring materials meeting such physical criteria are not commonly available, but suitable particulate material can be synthetically prepared by known methods. Illustrative of particulate materials that can be used are: non-metal oxides based on non-metals such as silicon and phosphorus, for example, silicon dioxide, phosphates and phosphites; metal oxides, metal silicates and metal salts, based on metals such as magnesium, calcium, titanium, barium, aluminum, iron, copper, and zinc; solid organic polymers, such as polystyrene, polyacrylonitrile, polyvinylalcohols, polyvinylchloride and copolymers thereof; solid inorganic polymers, such as polymeric metal alkoxides including polyorganosiloxanometalloxanes (e.g., polytriethylsiloxanoaluminoxane, and polytrimethylsiloxanotitanoxane), and silicones; graphite; carbon; and organic pigments, such as common paint pigments, including phthalocyanines. Particulate carbon (e.g., channel black) and inert metal and non-metal oxide particles, such as can be produced by hydrolysis of metal and non-metal chlorides in an oxygen-hydrogen flame (e.g., U.S. Pat. Nos. 3,083,115, 3,086,851 and 3,103,495), are preferred stabilizing agents. Particularly preferred are silicon dioxides (e.g., synthetic amorphous silica, hydrophilic or modified hydrophobic), titanium dioxides and aluminum oxides, such as are commercially available under the trademark "AEROSIL" from Degussa Corporation, under the trademark "CAB-O-SIL" from Cabot Corporation and under trademark "SYLOID" from W. R. Grace Co. Such inert oxides featuring an average primary particle size of about 0.007 to about 10 microns, having a surface area of about 50 to about 400 m$^2$/g, having a pH ranging from about 3 to about 5, and with a bulk density of from about 1 to about 10 lbs./ft.$^3$ are most preferred.

According to the present invention, at any step in the preparation of the foam ingredients, a small proportion of select fine particulate materials is blended into the polyol reactant composition in a manner to effectively disperse the particles as specified. This stabilizing agent may be added in any proportion effective to achieve the degree of stabilization desired for a particular formulation. It has been found preferable to employ the particulate agent in an amount ranging from about 0.1 to about 5.0 percent, based on the total polyol weight. Most preferably, about 0.25 to about 1.0 percent of the stabilizing agent is used.

In preparing polyurethane foam pursuant to the present invention, except for the inclusion of a stabilizing proportion of effectively dispersed fine particulate material as defined above, any prior art high resilience foam formulation may be employed. Such formulations comprise various combinations of polyether polyols, organic polyisocyanates, foaming agents and reaction catalysts.

The polyether polyol is one that is characterized by (1) a molecular weight of at least about 1,500, (2) a polyfunctional alcohol nucleus, (3) polyoxyalkylene chain segments attached through one end thereof to the nucleus, and (4) a ratio of primary to secondary hydroxyl end groups ranging from about 1.5:1 to about 5.5:1. This polyether can be prepared by methods generally well known in the art wherein a polyfunctional alcohol initiator is condensed, in the presence of an alkaline catalyst, first with an alkylene oxide having 3 or more carbon atoms and then with ethylene oxide.

The alcohol initiator which is used to prepare the polyether polyol can be any compound having 2-8 hydroxyl groups. Illustrative are ethylene glycol, propylene glycol, the butylene glycols such as 1,3-butylene glycol, the pentane diols such as 1,5 pentane diol, the hexane diols such as 1,6-hexane diol, glycerol, trimethylolpropane, sorbitol, pentaerythritol, methyl glucoside, sucrose, mixtures thereof and the like. It is preferred, however, to employ an aliphatic polyol having 2-4, and more preferably 3-4, hydroxyl groups, such as ethylene glycol, propylene glycol, glycerol, trimethylolpropane, sorbitol, and the like. The most preferred initiators are the aliphatic triols such as glycerol and trimethylolpropane.

In preparing the polyether polyol, a polyhydric alcohol initiator as described above is sequentially condensed, in the presence of an alkaline catalyst such as potassium hydroxide, first with an alkylene oxide having 3-8, and preferably 3-4, carbon atoms and then ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether having a molecular weight of at least about 1,500, and preferably from about 4,000 to about 7,000, and in which polyether the ratio of primary to secondary hydroxyl groups is from about 1.5:1 to about 5.5:1 and preferably from about 2:1 to about 5:1.

In accordance with a particularly preferred embodiment of the invention, the polyether polyol which is employed in preparing the polyurethane foam is an oxypropylated, oxyethylated aliphatic triol having a molecular weight of about 4,500–6,600 and a ratio of primary to secondary hydroxyl groups from about 3:1 to about 4.5:1.

In preparing the foams of the invention, any suitable organic polyisocyanate, or a mixture of polyisocyanates, may be employed as the isocyanate reactant. Illustrative are toluene diisocyanate, such as the 80:20 and the 65:35 mixtures of the 2,4- and 2,6-isomers, ethylene diisocyanate, propylene diisocyanate, methylenebis (4-phenyl) isocyanate, 3,3'-ditoluene-4,4'diisocyanate, hexamethylene diisocyanate, naphthalene-1,5-diisocyanate, polymethylene polyphenyl isocyanate, mixtures thereof, and the like. In accordance with a particularly preferred embodiment of the invention, an isomeric mixture of 2,4- and 2,6-toluene diisocyanate is employed in which the weight ratio of the 2,4-isomer to the 2,6-isomer is from about 60:40 to about 90:10 and more preferably from about 65:35 to about 80:20.

The total amount of polyisocyanates that is employed should generally be sufficient to provide at least 0.7 NCO group per hydroxyl group in the reaction system, which includes the polyether polyol, as well as any additional material and/or foaming agent present in the system. In practice a total amount of isocyanate reactant is usually employed as to provide no more than about 1.25, and preferably about 0.9–1.15 NCO groups per each hydroxyl group.

Any suitable foaming agent, or mixture of foaming agents, may be employed in preparing the polyurethane foam. These include inorganic foaming agents, such as water, and organic foaming agents containing up to 7 carbon atoms, such as the halogenated hydrocarbons and the low molecular weight alkanes, alkenes, and ethers. Illustrative organic foaming agents include monofluoro-trichloromethane, dichlorofluoromethane, dichlorodifluoromethane, 1,1,2-trichloro-1,2,2,-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluoro-trichloromethane and dichlorodifluoromethane, are preferred. The amount of foaming agent may be varied within a reasonably wide range as is well known in the art. Generally, however, the halogenated alkanes, for example, are employed in an amount of about 2–20 parts per 100 parts by weight of the polyether polyol; and water is employed in an amount of about 1–6 parts per 100 parts by weight of the polyether polyol.

The catalyst employed in preparing the foams of the invention may be any of the catalysts known to be useful for this purpose, including tertiary amines, organo-metallic salts, and mixtures of an organo-metallic salt with 1 or more tertiary amine, the latter being preferred. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV" and "Dabco 8020", respectively, bis(dimethylaminopropylether), and mixtures of these catalysts. The preferred tertiary amine catalysts are triethylene diamine, mixtures of bis(dimethylaminoethylether) and dipropylene glycol, dimethylcyclohexylamine alone or as a mixture thereof with 2(3-pentyl)-1-dimethylaminocyclohexame. The tertiary amine catalyst is used in a proportion of about 1.0–1.5, and preferably about 0.25–0.75, parts per 100 parts by weight of the total polyol which is employed in preparing the foam.

Typical organo-metallic salts include, for example, the salts of tin, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodeconates of these metals, the octoates being preferred. The organometallic salt catalyst is used in a proportion of about 0–0.5, and preferably about 0.05–0.2 parts per 100 parts by weight of total polyol which is employed in the preparation of the foam.

It is preferred in the preparation of the polyurethane foams of the invention to employ minor amount of a conventional surfactant in order to further improve the cell structure of the polyurethane foam. Suitable such surfactants include, for example, the silicon-based surfactants such as the silicones and the siloxaneoxyalkylene block copolymers, all of which are commercially available materials.

Generally, the silicones are employed in a proportion of up to about 0.1 parts per 100 parts by weight of the polyether polyol; and the siloxaneoxyalkylene block copolymers are employed in a proportion of up to about 2 parts per 100 parts by weight of the polyether polyol.

If desired, a curing agent, such as a conventional amine curing agent, may be included in the foam-forming reaction mixture. However, pursuant to the present invention, the use of curing agents is not necessary and therefore it is preferable to exclude such materials from the reaction mixture.

Various additives can also be employed to provide different properties in the polyurethane foam, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants, antioxidants and flame retardants may be added.

Foams prepared in accordance with the principles of the present invention are characterized by favorable processing characteristics and physical properties. The foams are substantially open-celled and become tack-free within a relatively short period of time after foaming cessation. Generally ranging in density from about 1.0 to about 5.0, preferably from about 1.7 to about 3.0, pounds per cubic foot, the cured foams feature a SAC factor in excess of 2.2, generally ranging from about 2.3 to about 3.0, and a ball rebound generally greater than about 55 percent. These high resilience foams are flexible and soft and exhibit little or no tendency to bottom out. In combination with good tear strength, tensile strength and elongation, the physical properties of the foams of the invention make them desirable for a variety of cushioning utilities.

The following examples are provided to further illustrate the invention.

EXAMPLE 1

Preparation of Polyol Containing Particulate Dispersion

30 Grams of synthetic fumed silica was added to 600 grams of a polyether polyol and mixed for about 10 minutes using a high shear blender having a blade tip speed of about 4,000 ft./min. to about 8,000 ft./min. The silica, obtained commercially under the trademark Cab-O-Sil Grade M-5 from Cabot Corporation, is reported to have a pH of 3.5–4.2 and a primary particle size of 14 millimicrons. The polyether polyol had a molecular weight of about 4,675 and was prepared by end-capping a propoxylated glycerine precursor with 15 moles of ethylene oxide to a final hydroxyl number of about 36. The effective maximum size of the particles and/or particle agglomerates in dispersion was measured, using a grind gauge, per ASTM D-1210-64, to be about 25 microns.

Comparative Example A

To demonstrate the criticality of the degree of dispersion in regard to stabilization effectiveness, a second dispersion was prepared, using the same components and proportions as in Example 1. In this comparative preparation, however, a conventional low shear blender, with a blade tip speed of less than 4,000 ft./min., was used to mix the dispersion for about 10 minutes. The effective maximum size of the particles and/or particle agglomerates in dispersion was measured to be greater than 100 microns.

EXAMPLE 2 AND COMPARATIVE EXAMPLE B

High resiliency polyurethane foams were prepared, using standard foam formulations, but including a proportion of the dispersed silica-polyol concentrates prepared according to Example 1 and Comparative Example A. Table I outlines the reaction mixture components and proportions employed. The reported processing results (pre-cure shrinkage) clearly indicate the stabilizing effect of employing effectively dispersed silica according to the present invention, while conventionally dispersed silica fails to accomplish foam stability.

TABLE I

| | Example 2 | Comparative Example B |
|---|---|---|
| Polyol ① | 86.5 | 86.5 |
| Product of Ex. 1 | 10 | — |
| Product of Comp. Ex. A | — | 10 |
| Supplemental Polyol ② | 3.5 | 3.5 |
| Diethanolamine | 0.4 | 0.4 |
| Triethylene Diamine ③ | 0.53 | 0.53 |
| Water | 2.4 | 2.4 |
| Surfactant ④ | 1.0 | 1.0 |
| Toluene Diisocyanate ⑤ Index | 109 | 109 |
| Dibutyltin Dilaurate | 0.1 | 0.1 |
| Foam Processing | Good, Open Foam - No Shrinking | Foam Shrinks |

①A polyether triol having a molecular weight of 4,500, prepared by KOH catalyzed oxyalkylation of glycerin first with propylene oxide and then with 10 moles of ethylene oxide.
②A polyether polyol having a molecular weight of 673, prepared by KOH catalyzed propoxylation of a 3/1 blend of dextrose/glycerin.
③Commercially available under the trademark "DABCO 33LV", consisting primarily of triethylene diamine (⅓) and dipropylene glycol (⅔).
④Commercially available polysiloxane surfactant sold under the trademark "Q2-5043" from Dow Corning.
⑤A mixture of toluene diisocyanate isomers (80:20 mixture of 2,4/2,6-isomers).

EXAMPLES 3–8

A standard gauge of foam stabilizing effectiveness is the "tin range", defined as the range over which the amount of tin catalyst in the foaming formulation can be varied while maintaining acceptable foam processing. The tin catalysts, such as dibutyltin dilaurate, are used to force the reaction between isocyanate and polyether at such a rate that viscosity is rapidly increased and the blowing gas is trapped and held. However, too much of an increase in viscosity growth results in a closed cell foam with relatively thick strong cell membranes, and exhibiting a very low air flow and accompanying pre-cure shrinkage. Too little of a rate of viscosity growth would cause extensive thinning of the cell membranes, cell rupture, loss of blowing gas and resultant foam collapse, settling or splitting.

To permit practical utility, a foam formulation must feature an acceptable "tin range" to avoid frequent foam product failure due to routine minor fluctuations in the pumped flow rate of the tin catalyst feed stream.

A series of examples were conducted to demonstrate the effect of dispersed particle size on foam stabilization as represented by tin range evaluations. Five percent dispersions of Cab-O-Sil Grade M-5 were prepared as outlined in Example 1, using mixers of varying shear to achieve the desired range of dispersed particle sizes. These dispersed silica-polyol concentrates were blended with additional polyol to produce 0.5% concentrations by weight of the silica, based on the total polyol weight. Free rise, high resilient foams were prepared, according to the formulations reported below in Table II, using standard hand-mix techniques. The amounts of dibutyltin dilaurate was varied with each formulation to determine the "tin range", representative of the foam stability achieved through use of each of the silica dispersions. The reported results illustrate that effective dispersion is a critical factor in foam processing stability. The narrow tin range evidenced by dispersed particle sizes greater than 100 microns is impractical and unsatisfactory.

TABLE II

| | Examples | | | | | |
|---|---|---|---|---|---|---|
| | 3 | 4 | 5 | 6 | 7 | 8 |
| Polyol ① | 96 | → | → | → | → | → |
| Supplemental Polyol ② | 3.5 | → | → | → | → | → |
| Dispersed Silica | 0.5 | → | → | → | → | → |

TABLE II-continued

| | Examples | | | | | |
|---|---|---|---|---|---|---|
| | 3 | 4 | 5 | 6 | 7 | 8 |
| Water | 2.0 | → | → | → | → | → |
| Triethylene Diamine ③ | 0.44 | → | → | → | → | → |
| Diethanolamine | 0.33 | → | → | → | → | → |
| Surfactant ④ | 1.0 | → | → | → | → | → |
| Toluene Diisocyanate ⑤ Index | 109 | → | → | → | → | → |
| Dibutyltin Dilaurate | Vary | → | → | → | → | → |
| Dispersed Phase Particle Size, Microns | >100 | 75 | 50 | 30 | 25 | 12.5 |
| Tin Range | 0.1–0.25 | 0.1–0.3 | 0.1–0.4 | 0.1–0.4 | 0.1–0.6 | 0.1–0.8+ |

①A polyether triol having a molecular weight of 4,500, prepared by KOH catalyzed oxyalkylation of glycerin first with propylene oxide and then with 10 moles of ethylene oxide.
②A polyether polyol having a molecular weight of 673, prepared by KOH catalyzed propoxylation of a 3/1 blend of dextrose/glycerin.
③Commercially available under the trademark "DABCO 33LV", consisting primarily of triethylene diamine (⅓) and dipropylene glycol (⅔).
④Commercially available polysiloxane surfactant sold under the trademark "Q2-5043" from Dow Corning.
⑤A mixture of toluene diisocyanate isomers (80:20 mixture of 2,4/2,6-isomers).

EXAMPLE 9 AND COMPARATIVE EXAMPLE C

Dispersed particle-polyol concentrates were prepared, using the general procedure of Example 1 and Comparative Example A, but employing fine particulate carbon rather than silica. The carbon, obtained commercially under the trademark Channel Black, Grade FW 200 from Degussa Corporation, is reported to have an average primary particle size of 13 millimicrons, a surface area of 460 m²/g and a pH of about 2.

Free rise high resilient foams were prepared, according to the general method of Example 2, using the particulate carbon dispersions within and outside the scope of the present invention. The formulations and results are tabulated below in Table III.

TABLE III

| | Example 9 | Comparative Example C |
|---|---|---|
| Polyol ① | 96 | 96 |
| Supplemental Polyol ② | 3.5 | 3.5 |
| Channel Black FW 200 | 0.5 | 0.5 |
| Water | 2.0 | 2.0 |
| Triethylene Diamine ③ | 0.44 | 0.44 |
| Diethanolamine | 0.33 | 0.33 |
| Surfactant ④ | 1.0 | 1.0 |
| Toluene Diisocyanate ⑤ Index | 109 | 109 |
| Dibutyltin Dilaurate | 0.1 | 0.1 |
| Dispersed Phase Particle Size, Microns | 55 | >100 |
| Foam Processing | Good, Open Foam | Shrinks |

①A polyether triol having a molecular weight of 4,500, prepared by KOH catalyzed oxyalkylation of glycerin first with propylene oxide and then with 10 moles of ethylene oxide.
②A polyether polyol having a molecular weight of 673, prepared by KOH catalyzed propoxylation of a 3/1 blend of dextrose/glycerin.
③Commercially available under the trademark "DABCO 33LV", consisting primarily of triethylene diamine (⅓) and dipropylene glycol (⅔).
④Commercially available polysiloxane surfactant sold under the trademark "Q2-5043" from Dow Corning.
⑤A mixture of toluene diisocyanate isomers (80:20 mixture of 2,4/2,6-isomers).

EXAMPLES 10 AND 11

Two dispersed particle-polyol concentrates were prepared, using the general procedure of Example 1, but employing titanium dioxide as the fine particulate material. The titanium dioxide used was obtained commercially from Degussa Corporation under the designation Grade P25. This material is reported to have an average primary particle size of 15–40 millimicrons, a surface area of about 50 m²/g and a pH value of 3–4.

Free rise high resilient foams were prepared, using standard procedures, from the formulations reported below in Table IV. Non-shrinking foams were accomplished.

TABLE IV

| | Example 10 | Example 11 |
|---|---|---|
| Polyol ① | 95.75 | 95.75 |
| Supplemental Polyol ② | 3.50 | 3.50 |
| Titanium Dioxide, P25 | 0.75 | 0.75 |
| Water | 2.0 | 2.0 |
| Triethylene Diamine ③ | 0.44 | 0.44 |
| Diethanolamine | 0.33 | 0.33 |
| Surfactant ④ | 1.0 | 1.0 |
| Toluene Diisocyanate ⑤ Index | 109 | 109 |
| Dibutyltin Dilaurate | 0.1 | 0.1 |
| Dispersed Phase Particle Size, Microns | 60 | 30 |
| Foam Processing | Good, Open Foam | Good, Open Foam |

①A polyether triol having a molecular weight of 4,500, prepared by KOH catalyzed oxyalkylation of glycerin first with propylene oxide and then with 10 moles of ethylene oxide.
②A polyether polyol having a molecular weight of 673, prepared by KOH catalyzed propoxylation of a 3/1 blend of dextrose/glycerin.
③Commercially available under the trademark "DABCO 33LV", consisting primarily of triethylene diamine (⅓) and dipropylene glycol (⅔).
④Commercially available polysiloxane surfactant sold under the trademark "Q2-5043" from Dow Corning.
⑤A mixture of toluene diisocyanate isomers (80:20 mixture of 2,4/2,6-isomers).

EXAMPLE 12

A dispersed particle-polyol concentrate was prepared, using the general procedure of Example 1, but employing aluminum oxide as the fine particulate material. The aluminum oxide used was obtained commercially from Degussa Corporation under the designation "Grade C". This material is reported to have an average primary particle size of 5 to 20 millimicrons, a surface area of 100 m²/g and a pH value of 4–5.

A free rise high resilient foam was prepared, using standard procedures, from the formulation outlined in Table V below. A stable, non-shrinking foam was obtained.

TABLE V

| | Example 12 |
|---|---|
| Polyol ① | 95.75 |
| Supplemental Polyol ② | 3.50 |
| Aluminum Oxide C | 0.75 |
| Water | 2.0 |
| Triethylene Diamine ③ | 0.44 |
| Diethanolamine | 0.33 |
| Surfactant ④ | 1.0 |
| Toluene Diisocyanate ⑤ Index | 109 |
| Dibutyltin Dilaurate | 0.1 |
| Dispersed Phase Particle Size, Microns | 15 |
| Foam Processing | Good, Open |

TABLE V-continued

| | Example 12 |
|---|---|
| | Foam |

①A polyether triol having a molecular weight of 4,500, prepared by KOH catalyzed oxyalkylation of glycerin first with propylene oxide and then with 10 moles of ethylene oxide.
②A polyether polyol having a molecular weight of 673, prepared by KOH catalyzed propoxylation of a 3/1 blend of dextrose/glycerin.
③Commercially available under the trademark "DABCO 33LV", consisting primarily of triethylene diamine (⅓) and dipropylene glycol (⅔).
④Commercially available polysiloxane surfactant sold under the trademark "Q2-5043" from Dow Corning.
⑤A mixture of toluene diisocyanate isomers (80:20 mixture of 2,4/2,6-isomers).

EXAMPLES 13–17

A dispersion of a synthetic amorphous silica was prepared by mixing 30 g of the silica with 500 g of a polyether polyol, using a high shear mixer. The silica, obtained commercially under the trademark "SYLOID 244" from W. R. Grace Co., had a bulk density of about 7 lbs./ft.$^3$, an average primary particle size of about 4 microns, and a surface area of about 310 m$^2$/g. The polyether polyol had a molecular weight of about 4675 and was prepared by end-capping a propoxylated glycerine precursor with 15 moles of ethylene oxide. The resulting dispersion, a silicapolyol concentrate was turbid in appearance and had a viscosity, cps @250° C., of 2,000.

High resilience, flexible polyurethane foams were prepared using standard foam formulations, but including a proportion of the silica-polyol concentrate, described above. Table VI outlines the ingredients and proportions utilized. Comparative Example D exemplifies a foam prepared without any stabilizing agent; Comparative Example E exemplifies the prior art stabilization method of including a polymer-polyol component, as discussed in the specification.

In each example, the ingredients were mixed together and poured into a square cardboard box. A foam product was obtained which was observed for shrinkage or collapse during room temperature curing. After measuring the core density of each foam, its physical properties were determined—compression set, tensile strength, elongation, tear strength, ball rebound, air flow, and SAC factor (per ASTM D-1564-64T). The results of the physical property testing is tabulated in Table VII, below.

TABLE VI

| Reaction Mixture Ingredients | Comparative Example D (pbw) | Example 13 (pbw) | Example 14 (pbw) | Example 15 (pbw) | Example 16 (pbw) | Example 17 (pbw) | Comparative Example E (pbw) |
|---|---|---|---|---|---|---|---|
| Polyether Polyol ① | 100 | 90 | 70 | 70 | 70 | 70 | 80 |
| Polymer-Polyol ② | — | — | — | — | — | — | 20 |
| Silica Concentrate | — | 10 | 30 | 30 | 30 | 30 | — |
| Triethylene Diamine ③ | 0.4 | 0.4 | 0.4 | 0.5 | 0.6 | 0.6 | 0.4 |
| Tertiary Amine Catalyst ④ | — | — | — | 0.05 | 0.05 | 0.05 | — |
| Surfactant ⑤ | — | 1.0 | 1.0 | — | — | — | — |
| Surfactant ⑥ | 1.1 | — | — | 1.0 | 1.2 | 1.2 | 1.1 |
| Diethanolamine | 0.8 | 0.8 | 0.8 | 0.8 | 0.8 | 0.8 | 0.8 |
| Water | 2.0 | 2.0 | 2.0 | 2.0 | 2.0 | 2.0 | 2.0 |
| Dibutyltin Dilaurate | 0.1 | 0.1 | 0.1 | 0.1 | 0.1 | 0.15 | 0.1 |
| Toluene Diisocyanate ⑦ Index | 109 | 109 | 109 | 109 | 109 | 109 | 109 |
| Gel (sec.) | 120 | 130 | 215 | 165 | 150 | 120 | 100 |
| Pre-Cure Foam Shrinkage | Yes | Yes | No | No | No | No | No |

①A polyether triol having a molecular weight of 4,675, prepared by KOH catalyzed oxyalkylation of glycerin first with propylene oxide and then end-capped with 15 moles of ethylene oxide.
②Commercially available under the trademark "UC 31-28" from Union Carbide Corporation.
③Commercially available under the trademark "DABCO 33LV", consisting primarily of triethylene diamine (⅓) and dipropylene glycol (⅔).
④Commercially available under the trademark "NIAX A-1" from Union Carbide Corporation.
⑤Commercially available polysiloxane surfactant sold under the trademark "NIAX L-5303" from Union Carbide Corporation.
⑥Commercially available polysiloxane surfactant sold under the trademark "Q2-5043" from Dow Corning.
⑦A mixture of toluene diisocyanate isomers (80:20 mixture of 2,4/2,6-isomers).

TABLE VII

| Physical Properties | Comparative Example D | Example 13 | Example 14 | Example 15 | Example 16 | Example 17 | Comparative Example E |
|---|---|---|---|---|---|---|---|
| Compression Load Deflection | | | | | | | |
| @ 25% Deflection | 0.26 | 0.24 | 0.36 | 0.34 | 0.31 | 0.31 | 0.35 |
| @ 65% Deflection | 0.66 | 0.58 | 0.86 | 0.79 | 0.74 | 0.74 | 0.87 |
| SAC Factor | 2.5 | 2.44 | 2.4 | 2.4 | 2.4 | 2.4 | 2.5 |
| Density, pcf | 3.05 | 2.67 | 3.14 | 3.07 | 2.9 | 2.96 | 2.9 |
| Comp. Set, 75%, C(T) | 4.7 | 6.1 | 4.25 | 3.6 | 3.5 | 3.5 | 4.1 |
| Tensile, psi | 6.7 | 11.2 | 11 | 7.7 | 8.5 | 9.0 | 7.9 |
| Elongation, % | 93 | 123 | 137 | 107 | 110 | 120 | 83 |
| Tear, pli | 0.8 | 1.2 | 1.23 | 1.03 | 1.0 | 0.9 | 1.2 |
| Ball Rebound, % | 61 | 54 | 45 | 64 | 64 | 65 | 65 |
| Air Flow, cfm | 3.03 | 1.33 | 1.4 | 2.0 | 2.2 | 2.04 | 2.9 |

EXAMPLE 18

The following mixture of foaming ingredients was poured in an aluminum mold (6"×6"×6") and heated to 120° F. At the end of foam rise, the mold was placed in an oven at 300° F. for 6 minutes. The foams were then removed and cut in two pieces—to observe its structure. The foam containing dispersed particulate stabilizer did not exhibit any shrinkage, while the comparative example without any stabilizer shrank quite considerably and would be considered not acceptable.

TABLE VIII

|  | Example 18 (pbw) | Comparative Example F (pbw) |
|---|---|---|
| Polyether Polyol ① | 100 | 100 |
| Particulate Silica ② | 0.75 | — |
| Water | 2.5 | 2.5 |
| Catalyst ③ | 0.27 | 0.27 |
| Catalyst ④ | 0.09 | 0.09 |
| Diethanolamine | 0.8 | 0.8 |
| Surfactant ⑤ | 1.0 | 1.0 |
| Dibutyltin Dilaurate | 0.1 | 0.1 |
| Toluene Diisocyanate ⑥ Index | 109 | 109 |
| Foam Stabilization | No Shrinkage | Shrinkage |

①A polyether triol having a molecular weight of 4,500, prepared by KOH catalyzed oxyalkylation of glycerin first with propylene oxide and then with 10 moles of ethylene oxide.
②Commercially available under the trademark "CAB-O-SIL M-5" from Cabot Corporation.
③Commercially available under the trademark "DABCO 33LV", consisting primarily of triethylene diamine (⅓) and dipropylene glycol (⅔).
④Commercially available under the trademark "NIAX A-1" from Union Carbide Corporation.
⑤Commercially available polysiloxane surfactant sold under the trademark "Q2-5043" from Dow Corning.
⑥A mixture of toluene diisocyanate isomers (80:20 mixture of 2,4/2,6-isomers).

We claim:

1. A polyol composition comprising a polyether polyol including a proportion of an effectively dispersed finely divided solid particulate material having an effective maximum particle size in dispersion of less than about 75 microns, said polyol being a polyether polyol having a molecular weight of at least about 1,500, a polyhydroxy alcohol nucleus having a functionality from about 2 to about 8, polyoxyalkylene chain segments attached to said nucleus, and a ratio of primary to secondary hydroxyl end groups ranging from about 1.5:1 to about 5.5:1.

2. The polyol composition of claim 1 wherein said particulate material is dispersed to an effective particle size in dispersion of less than about 50 microns.

3. The polyol composition of claim 2 wherein said particulate material is dispersed to an effective particle size in dispersion of less than about 25 microns.

4. The polyol composition of claim 1 wherein said finely divided solid particulate material is selected from the group consisting of non-metal oxides, metal oxides, metal silicates, metal salts, solid organic polymers, solid inorganic polymers, carbon, organic pigments, and mixtures thereof.

5. The polyol composition of claim 4 wherein said particulate material is selected from the group consisting of synthetic silicon dioxide, titanium dioxide, aluminum oxide, and mixtures thereof.

6. The polyol composition of claim 5 wherein said particulate material is a synthetic amorphous silica.

7. The polyol composition of claim 6 wherein said particulate material is a synthetic hydrophobic amorphous silica.

8. The polyol composition of claim 7 wherein, prior to dispersion into said polyol, said particulate material has an average primary particle size of about 0.007 to about 10 microns, a pH ranging from about 3 to about 5, a surface area of about 50 to about 400 m$^2$/g, and a bulk density of about 1 to about 10 lbs./ft.$^3$, dispersed to an effective maximum particle size in dispersion ranging from about 10 to about 20 microns.

9. A process for preparing a polyol composition comprising blending
    (a) a polyether polyol having a molecular weight of at least about 1,500, a polyhydroxy alcohol nucleus having a functionality from about 2 to about 8, polyoxyalkylene chain segments attached to said nucleus, and a ratio of primary to secondary hydroxyl end groups ranging from about 1.5:1 to about 5.5:1;
    with (b) finely divided particulate material;
    to form a dispersion wherein said finely divided solid particulate material having an effective maximum particle size in dispersion of less than about 75 microns.

* * * * *